Patented Nov. 16, 1948

2,454,047

UNITED STATES PATENT OFFICE 2,454,047

CONVERSION OF ALICYCLIC ALDEHYDES

Harry de V. Finch, El Cerrito, Seaver A. Ballard, Orinda, and Theodore W. Evans, Oakland, Calif., assignors to Shell Development Company, San Francisco, Calif., a corporation of Delaware No Drawing. Application May 9, 1947,
Serial No. 747,128

20 Claims. (Cl. 260—514)

This invention relates to a process for the conversion of alicyclic aldehydes, the production of alicyclic acids and alcohols, and the production of aliphatic dicarboxylic acids. More particularly, this invention provides a process whereby alicyclic aldehydes may be converted simultaneously to alicyclic acids and alcohols, and whereby the alicyclic acids so produced may be further acted upon to produce aliphatic dicarboxylic acids.

Certain reactions for the conversion of aldehydes to acids are well known, and various processes for these reactions have been described. However, these heretofore known reactions are not generally applicable to alicyclic aldehydes, especially where the alicyclic aldehyde contains one or more unsaturated linkages of olefinic character between two nuclear carbon atoms, since the necessary reagents or reaction conditions commonly cause ring cleavage in such cases, thereby precluding formation of alicyclic acids, and usually result in the formation of an aliphatic monocarboxylic acid. Accordingly, it is an object of the present invention to provide a process for the conversion of alicyclic aldehydes, and especially those alicyclic aldehydes having at least one unsaturated linkage of olefinic character between two nuclear carbon atoms, to alicyclic acids. A further object is the production of alicyclic alcohols in the same step of the process. A further object, is to react the alicyclic acids so produced so that aliphatic dicarboxylic acids are produced. A further object is to produce aliphatic dicarboxylic acids from alicyclic aldehydes without separating the intermediate alicyclic acid from the reaction mixture.

The aliphatic dicarboxylic acids produced according to the process of the present invention are well known, and various methods for their preparation have been described. For example, methods for the preparation of pimelic acid, a typical dicarboxylic acid representative of those herein contemplated which have been heretofore described, include its preparation from pentamethylene dibromide through the cyanide process, and from trimethylene dibromide by means of the malonic or acetoacetic ester synthesis. However, these methods are commonly suitable for laboratory scale preparation only, since the cost of the reactants and the necessity for close control over the reaction conditions prevent satisfactory commercial scale operations. These known processes for producing aliphatic dicarboxylic acids do not indicate that such acids might successfully be prepared from alicyclic aldehydes. The alcohols produced in the course of the present process, as hereinafter described, are of a new and useful variety.

The present invention provides an efficient and economical process for producing dicarboxylic acids which obviates the objections to prior art processes, and which is especially adaptable to the commercial production thereof, and in the course of which alicyclic acids and new and valuable alicyclic alcohols are produced.

According to our invention, more fully described hereinafter, an alicyclic aldehyde is contacted with a substantially anhydrous molten or "fused" alkali metal hydroxide, or mixture of two or more alkali metal hydroxides. The resulting alkali metal carboxylate may or may not be separated from the reaction mixture. If separated, it constitutes a valuable product which may be converted by methods known to the art to the corresponding acid if desired, or it may be further acted upon with an aqueous solution of an alkaline material, as hereinafter fully described, to produce the salt of an aliphatic dicarboxylic acid. This salt may be converted, also by methods known to the art, to the corresponding acid if desired. If the alkali metal carboxylate is not separated from the reaction mixture, the salt of a dicarboxylic acid, and subsequently the dicarboxylic acid, may be prepared directly therefrom by treating the reaction mixture with water, with adjustment of the concentration of the alkali if necessary and heating the resulting mixture, as hereinafter described. The aliphatic dicarboxylic acid, prepared by either process, may be recovered by any convenient means, as by extraction of the acid salts with ether, acidification with hydrochloric acid, extraction of the acid with ether, and evaporation of the ether.

In carrying out the process of our invention we have made the surprising discovery that, on contacting an alicyclic aldehyde with a bath comprising a molten alkali metal hydroxide, or a mixture of such hydroxides, significant yields of alicyclic alcohols are obtained. These alcohols may be separated from the reaction mixture, which comprises chiefly the alkali metal carboxylate, the desired alcohol, and unreacted alkali metal hydroxide, by dissolving the cooled reaction mixture in water, acidifying with hydrochloric acid, extracting with ether, and distillating the ether extract. The acid and alcohol are separated by the distillation.

The initial reactants of the present invention, alicyclic aldehydes, preferably have from 4 to 8 carbon atoms in the nucleus or ring, though compounds with larger rings may be used, and preferably the reactants have one double bond of olefinic character between two of the nuclear carbon atoms, though alicyclic aldehydes with one or with two or even more such double bonds may be employed and are within the scope of the present invention. The term "alicyclic," as used herein with respect to aldehydes, acids and alcohols, is meant to include those aldehydes, acids, and alcohols which have a cyclic portion of aliphatic character, and which may have one or more double bonds of olefinic character between two nuclear carbon atoms, but which excludes all compounds having three conjugate double bonds in a six membered ring, i. e., compounds of aromatic character. The alicyclic aldehyde reactants may be obtained from any convenient source. For example, 3-cyclohexenecarboxaldehyde, used hereinafter to illustrate preferred embodiments of the present invention, may be obtained by methods known to the art, as for example by the addition reaction between butadiene and acrolein.

In converting an alicyclic aldehyde to an alicyclic acid with simultaneous formation of an alicyclic alcohol, according to the process of our invention, the aldehyde is contacted with a molten bath of any of the alkali metal hydroxides, or any mixture of said hydroxides, e. g., molten sodium or potassium hydroxide, or a mixture thereof. We have found that molten mixtures of sodium and potassium hydroxides give excellent results, and the mixture may advantageously comprise 1 mol of potassium hydroxide to ½ to 4 mols of sodium hydroxide, which is the preferred range. Technical grade hydroxides may be used, since we have found that the usual impurities do not deleteriously affect the process.

In carrying out the process of our invention, we prefer to contact the aldehyde reactant with the molten alkali metal hydroxide by passing the vapors of the aldehyde into a bath of molten hydroxide. However, other methods of contacting the aldehyde with the molten bath may be employed. For example, an aldehyde, and especially those aldehydes with a relatively high boiling point, may be contacted with the molten bath by introducing the aldehyde in liquid form beneath or upon the surface of the molten bath, in which method the liquid may or may not be preheated before contacting. A further modification which may be desirable in some instances is to contact the aldehyde in solid form with the molten bath.

The temperature of the bath is not critical, but should be sufficiently high so that adequate mixing may be achieved, and may advantageously be from about 200° C. to about 470° C. We have found that relatively low temperatures favor formation of the alcohol. The rate of addition of the vapors of the alicyclic aldehyde to the molten hydroxide is not critical, and may advantageously be varied for example from about 1 to 5 mols per hour per 1000 grams of the molten hydroxide bath.

As above stated, when alicyclic aldehydes are contacted with the molten alkali metal bath at relatively low temperatures, formation of the alicyclic alcohols are favored. This is illustrated in Examples I and II, wherein the molten baths were held at 250° C. and 200° C., and the yields of the alicyclic alcohols, in these examples 3-cyclohexenemethanol, were 10 and 18%, respectively. In carrying out the process of our invention, therefore, if the alcohols of our invention are desirous as products, the molten alkali metal hydroxide baths should be operated in the lower region of the recited temperature limits.

In converting the alicyclic acid formed in the above-described step to the aliphatic dicarboxylic acid, the acid and an aqueous solution of an alkaline material are introduced into a vessel designed to withstand the pressure developed on heating to the desired temperature, hereinafter described. The proportions of acid, alkaline material and water may be varied considerably, but may advantageously be within the range of from about 0.5 to 2 mols of the acid, about 1.3 to 4 mols of alkaline material and about 35 to 85 mols of water. If the acid was not separated from the reaction mixture in the above-described step, the composition of the reaction mixture containing the alkali metal salt of the acid and free alkali metal hydroxide may be adjusted usually by adding water and, if necessary, an additional quantity of an alkaline material, to bring the composition substantially within the above recited limits. In carrying out this step, we prefer to use an aqueous solution of an alkali metal hydroxide. However, excellent results may be achieved with aqueous solutions of other alkaline materials, such as the alkaline earth hydroxides, e. g., barium hydroxide or strontium hydroxide, and aqueous solutions of salts of weak acids and strong bases, e. g., sodium phosphate. The reaction mixture is then heated under ambient pressure, though higher or lower pressures may be employed if desirable, to a temperature of from about 250° C. to about 450° C. In most instances temperatures of from about 280° C. to about 380° C. give excellent results and are preferred. After sufficient time for reaction has been allowed, usually from 2 to 10 hours, the dicarboxylic acid formed may be separated by any convenient means. For example, the acid salt may be extracted with ether, the ether extract acidified with hydrochloric acid, the acid extracted with ether, and the ether evaporated.

The products prepared according to the process of our invention have many uses. For example, the alicyclic acids may be treated to form esters, useful as plasticizers for various resins, the new alicyclic alcohols are useful as solvents, and form derivatives useful in detergent compositions, as emulsifying agents, and as driers in resins and varnishes, and the aliphatic dicarboxylic acids may be used in the production of polyamide-type resins, as intermediates in the production of other resins, and on esterification yield esters which are valuable as plasticizers in resins and rubber compositions.

In order to illustrate a preferred embodiment of the present invention, the processing of 3-cyclohexenecarboxaldehyde to produce 3-cyclohexenemethanol and pimelic acid is described hereafter. The vapors of 3-cyclohexenecarboxaldehyde are passed into a bath comprising molten potassium and sodium hydroxide in mol ratio of from 1:0.5 to 1:4, at a rate of from 1 to 5 mols per hour per 1000 grams of the molten bath. The reaction is stopped while there is still excess alkali, the reaction mixture cooled, dissolved in water, acidified with an aqueous solution of a mineral acid, extracted with ether, and the ether extract fractionated. Fractionation yields 3-cyclohexenecarboxylic acid and 3 - cyclohexenemethanol. An aqueous solution of an alkaline material, e. g., sodium or potassium hydroxide, is added to the 3-cyclohexenecarboxylic acid so that the resulting mixture has a mol composition of acid: sodium or potassium hydroxide: water within the range of from about 0.5 to 2:1.3 to 4:35 to 85. This mixture is heated in a pressure vessel, such as a stainless steel bomb, to from about 250° C. to 450° C. for from about 2 to 10 hours. The reaction mixture is then acidified with an aqueous solution of a mineral acid, e. g., hydrochloric acid, extracted with ether, and the ether evaporated. The pimelic acid product may be further purified if desired. The 3-cyclohexenemethanol, prepared as above-described in accordance with the process of our invention, is a new composition of matter, and possesses properties which make it especially useful as an emulsifying agent, a drier for resins and varnishes, and a solvent for a wide variety of organic materials.

In a substantially identical manner other alicyclic aldehydes may be processed according to the present invention to produce alicyclic acids, alicyclic alcohols, and dicarboxylic acids. Examples of alicyclic aldehydes which may be employed in our invention include: 1-cyclobutenecarboxaldehyde, 2 - cyclobutenecarboxaldehyde, 1-cyclopentenecarboxaldehyde, 2 - cyclopentenecarboxaldehyde, 3 - cyclopentenecarboxaldehyde, 1-cyclohexenecarboxaldehyde, 2-cyclohexenecarboxaldehyde, 3-cyclohexenecarboxaldehyde, 1,-cycloheptenecarboxaldehyde, 2-cycloheptenecarboxaldehyde, 3-cycloheptenecarboxaldehyde, 4-cycloheptenecarboxaldehyde, 1 - cyclooctenecarboxaldehyde, 2 - cyclooctenecarboxaldehyde, 3- cyclooctenecarboxaldehyde, 4-cyclooctenecarboxaldehyde, cyclobutanecarboxaldehyde, cyclopentanecarboxaldehyde, cyclohexanecarboxaldehyde, cycloheptenecarboxaldehyde, cyclooctanecarboxaldehyde, and their analogues and homologues. Substituted alicyclic aldehydes may also be employed, such as 3-methyl-1-cyclobutenecarboxaldehyde, 2-methyl - 3 - cyclohexanecarboxaldehyde, 2-ethyl-3-cyclohexenecarboxaldehyde, 2,5-dimethyl-3-cyclohexenecarboxaldehyde, 2-ethyl-3-cyclohexenecarboxaldehyde, 2-isopropyl-3-cyclohexenecarboxaldehyde, 3-cyclohexene - ethanal, cyclohexane-ethanal, 1 - cyclobutene-3-proponal, cyclopentane-4-butanal, and the like.

In carrying out the process of our invention, the products, namely the alicyclic acids and alcohols, and the aliphatic dicarboxylic acids, will generally have the same number of carbon atoms as the initial alicyclic aldehyde reactant. For example, in the conversion of 3-cyclohexenecarboxaldehyde, the products, 3-cyclohexenecarboxylic acid, 3-cyclohexenemethanol, and pimelic acid, all contain the same number of carbon atoms as the 3-cyclohexenecarboxaldehyde. However, in some instances, products containing fewer carbon atoms than the alicyclic aldehyde reactant may be produced without departing from the scope of our invention. For example, if 3-cyclohexene-3-propanal be employed as the initial reactant, the resulting products may contain the same number of carbon atoms, or they may, individually or in any combination, contain a fewer number of carbon atoms. In this case 3-cyclohexene-3-propionic acid, 3 - cyclohexene-3-propanol, azelaic acid, 3-cyclohexenecarboxylic acid, 3-cyclohexenemethanol, and pimelic acid may be among the products obtained, depending somewhat upon the reaction conditions. The formation of products containing a fewer number of carbon atoms than the initial alicyclic aldehyde reactant is especially noticeable when employing alicyclic aldehydes characterized by a relatively large ring, e. g., a ring containing 7 or more carbon atoms, and particularly if such compounds contain more than one double bond between nuclear carbon atoms. However, the tendency of alicyclic aldehydes to form products with a different number of carbon atoms, in the process of our invention, is not marked, and may be controlled to a considerable extent by proper choice of the reaction conditions, such as the temperature of the molten alkali metal hydroxide bath. The preferred process of our invention, therefore, contemplates the processing of alicyclic aldehydes to produce corresponding alicyclic acids, alcohols, and aliphatic dicarboxylic acids, i. e., the products contain the same number of carbon atoms as the alicyclic aldehyde reactant.

Various modifications may be made in the present invention as herein described without departing from its scope. For example, various mixtures of alkali metal hydroxides may be employed in either step, and various alkaline materials may be employed in the second step, i. e., in converting the alicyclic acid to the aliphatic dicarboxylic acid; the first step, the conversion of an alicyclic aldehyde to an alicyclic acid, may be carried out at super or sub-atmospheric pressure; and continuous or intermittent instead of the batchwise process herein described may be employed. Other modifications will be apparent to those skilled in the art.

The following examples illustrate preferred embodiments of our invention, which is not to be considered as limited thereby:

Example I 0.98 mol of vaporized 3-cyclohexenecarboxaldehyde were passed into a molten mixture comprising 4.0 mols of sodium hydroxide and 3.11 mols of potassium hydroxide held to a temperature of about 250° C. at a rate of 0.9 mol per hour. Some hydrogen was evolved. The cooled reaction mixture was dissolved in water, acidified with aqueous hydrochloric acid, and extracted with ether. Fractionation of the ether extract yielded 3-cyclohexenecarboxylic acid and 3-cyclohexenemethanol. Conversion to 3-cyclohexenecarboxylic acid was 82% and to 3-cyclohexenemethanol was 10%.

The acid thus obtained melted at from 13 to 14° C., boiled at from 85 to 88° C. (1 mm.), and had an equivalent weight of 129. The infra-red spectrum indicated the structure to be that of 3-cyclohexenecarboxylic acid.

Properties of the new alcohol, 3-cyclohexenemethanol, were determined to be as follows: boiling point=70.6° C. to 74.0° C. at 5 mm. mercury pressure; bromine number=151 grams per 100 grams; melting point of the alpha-naphthyl urethane derivative=104° C.; hydroxyl value= 0.854 equivalent per 100 grams. Analysis for carbon and hydrogen gave 74.3 and 10.8 weight percent. respectively.

A solution of 0.149 mol of the 3-cyclohexene carboxylic acid and 0.38 mol of sodium hydroxide in 7.2 mols of water was heated to from 325° C. to 340° C. for 4 hours in a stainless steel bomb. The resulting reaction mixture was acidified with aqueous hydrochloric acid and extracted with ether. Evaporation of the ether yielded pimelic acid, the conversion being 66%.

Example II

Example I was repeated with the following modifications: the temperature of the molten alkali metal hydroxide was held to about 200° C., 1.13 mols of 3-cyclohexenecarboxaldehyde vapor was introduced into the molten caustic, and the temperature of the 3-cyclohexenecarboxylic acid-sodium hydroxide-water mixture was held to from about 300° C. to about 325° C. for 8 hours.

A substantially identical conversion to pimelic acid was obtained as in Example I, and a higher conversion to 3-cyclohexenemethanol was obtained, namely 18%.

*Example III*

The vapors of 3-cyclopentenecarboxaldehyde are contacted with molten sodium hydroxide at a temperature of about 350° C. at a rate of about 3 mols of the vapor per hour per 1000 grams of the molten sodium hydroxide. The reacted mixture is treated according to the procedure of Example I, and 3-cyclopentenecarboxylic acid, 3-cyclopentenemethanol, and adipic acid are recovered as products.

The invention claimed is:

1. A process for converting an alicylic aldehyde to an alicyclic acid which comprises contacting said alicyclic aldehyde with a molten alkali metal hydroxide at a temperature not greater than about 470° C.

2. A process for converting an alicyclic aldehyde to an alicyclic acid which comprises contacting said alicyclic aldehyde with a molten alkali metal hydroxide at a temperature of from about 200° C. to about 470° C.

3. A process for converting an alicyclic aldehyde to an alicyclic acid which comprises contacting said alicyclic aldehyde with a molten mixture of sodium hydroxide and potassium hydroxide at a temperature not greater than about 470° C.

4. A process for converting an alicyclic aldehyde to an alicyclic acid and an alicyclic alcohol which comprises contacting said alicyclic aldehyde with a molten alkali metal hydroxide at a temperature not greater than about 470° C.

5. A process for converting an alicyclic aldehyde to an alicyclic acid and an alicyclic alcohol which comprises contacting said alicyclic aldehyde with a molten alkali metal hydroxide at a temperature of from about 200° C. to about 470° C., and separating alicyclic acid and the alicyclic alcohol.

6. A process for converting an alicyclic aldehyde which contains one double bond of olefinic character between two nuclear carbon atoms to an alicyclic acid, which comprises contacting said alicyclic aldehyde with molten alkali metal hydroxide at a temperature not greater than about 470° C.

7. A process for simultaneously converting an alicyclic aldehyde which contains one double bond of olefinic character between two nuclear carbon atoms to the corresponding unsaturated aliphatic acid and the corresponding unsaturated alicyclic alcohol, which comprises contacting said unsaturated aliphatic aldehyde with molten alkali metal hydroxide at a temperature of about 380° C.

8. A proces for converting an alicyclic aldehyde to an alicyclic alcohol, which comprises contacting said alicyclic aldehyde with a molten alkali metal hydroxide at a temperature not greater than about 380° C.

9. The process for converting an alicyclic aldehyde to an aliphatic dicarboxylic acid, which comprises contacting said alicyclic aldehyde with a molten alkali metal hydroxide at a temperature not greater than about 470° C., acidifying the resulting reaction mixture, separating the produced alicyclic acid, and reacting said alicyclic acid with an aqueous alkaline solution at an elevated temperature and pressure at a temperature of from about 250° C. to about 450° C.

10. The process for converting an alicyclic aldehyde containing one unsaturated linkage of olefinic character between two nuclear carbon atoms to an aliphatic dicarboxylic acid, which comprises contacting said alicyclic aldehyde with a molten mixture of sodium and potassium hydroxide at a temperature of from about 200° C. to about 470° C., separating the produced alicyclic acid, and heating said alicyclic acid with an aqueous alkaline material to a temperature of from about 250° C. to about 450° C. at an elevated pressure.

11. The process for converting an alicyclic aldehyde to the corresponding aliphatic dicarboxylic acid, which comprises introducing said alicyclic aldehyde into a molten mixture of sodium hydroxide and potassium hydroxide at a temperature of from about 200° C. to about 470° C., stopping the reaction before complete consumption of the alkali, acidifying the reaction mixture, separating the produced alicyclic acid, and heating said alicyclic acid with an alkali metal hydroxide and water to from about 280° C. to 380° C. for from 2 to 10 hours at an elevated pressure.

12. The process for converting an alicyclic aldehyde to an aliphatic dicarboxylic acid, which comprises introducing said alicyclic aldehyde in vapor form into a molten alkali metal hydroxide at a temperature of from about 200° C. to about 470° C., stopping the introduction of said alicyclic aldehyde into said molten alkali metal hydroxide before complete consumption of said hydroxide, adjusting the composition of the reaction mixture so that the mol ratio of acid: alkali: water is within the range of about 0.5 to 2:1,3 to 4:35 to 85, and heating said reaction mixture to from about 250° C. to about 450° C. at an elevated pressure.

13. The process for converting 3-cyclohexenecarboxaldehyde to 3-cyclohexenecarboxylic acid, which comprises contacting 3-cyclohexenecarboxaldehyde with a molten alkali metal hydroxide at a temperature not greater than about 470° C., and acidifying the resulting reaction mixture.

14. A process for producing pimelic acid, which comprises reacting 3-cyclohexenecarboxaldehyde with molten alkali metal hydroxide at a temperature of from about 200° C. to 470° C., acidifying the resulting reacted mixture, separating 3-cyclohexenecarboxylic acid therefrom, and reacting said 3-cyclohexenecarboxylic acid with water and an alkaline material at a temperature of from 250° C. to about 450° C. and an elevated pressure.

15. A process according to claim 14 wherein the alkaline material is an alkali metal hydroxide.

16. A process for producing pimelic acid, which comprises contacting the vapors of 3-cyclohexenecarboxaldehyde with a molten mixture of sodium hydroxide and potassium hydroxide at a temperature of from about 200° C. to about 470° C. stopping the reaction before the alkali is completely consumed, adding water to the reacted mixture, and heating the resulting aqueous mixture to a temperature of from about 250° C. to about 450° C. at an elevated pressure, acidifying the resulting reacted mixture, and separating pimelic acid therefrom.

17. A process for converting 3-cyclohexanecarboxaldehyde to 3-cyclohexenecarboxylic acid and 3-cyclohexenemethanol which comprises contacting 3-cyclohexenecarboxaldehyde with a molten alkali metal hydroxide at a temperature not greater than about 470° C.

18. A process for converting 3-cyclohexenecarboxaldehyde to 3-cyclohexenemethanol which comprises contacting 3-cyclohexenecarboxaldehyde with a molten alkali metal hydroxide at a temperature not greater than about 380° C.

19. A process for converting an alicyclic aldehyde to an alicyclic alcohol which comprises contacting an aldehyde which contains one double bond of olefinic character between two nuclear carbon atoms with a molten alkali metal hydroxide at a temperature not greater than about 380° C.

20. A process for the preparation of 3-cyclohexenecarboxylic acid which comprises contacting 3-cyclohexenecarboxaldehyde with a molten alkali metal hydroxide at a temperature not greater than about 380° C.

HARRY DE V. FINCH.
SEAVER A. BALLARD.
THEODORE W. EVANS.

REFERENCES CITED

The following references are of record in the file of this patent:

UNITED STATES PATENTS

| Number | Name | Date |
|---|---|---|
| 2,285,601 | McAllister | June 9, 1942 |
| 2,286,559 | McAllister | June 16, 1942 |

OTHER REFERENCES

Fiesselmann, Ber. Deut. Chem. Gesell., vol. 75, pages 881–889 (1942).

French et al., J. Am. Chem. Soc. vol. 64, pages 1479–1499 (1942).